(12) United States Patent
Chen et al.

(10) Patent No.: US 7,370,038 B2
(45) Date of Patent: May 6, 2008

(54) STEREOGRAPHIC NETWORK MONITORING SYSTEM AND METHOD THEREOF

(75) Inventors: Margaret Chen, Taipei (TW);
Lien-Hsun Chen, Taipei (TW);
Chung-Chian Chen, Taipei (TW);
Hsiao-Fen Lu, Taipei (TW)

(73) Assignee: Inventec Corporation (TW)

( * ) Notice: Subject to any disclaimer, the term of this patent is extended or adjusted under 35 U.S.C. 154(b) by 392 days.

(21) Appl. No.: 11/096,772

(22) Filed: Mar. 31, 2005

(65) Prior Publication Data

US 2006/0224567 A1 Oct. 5, 2006

(51) Int. Cl.
*G09B 19/00* (2006.01)
(52) U.S. Cl. ............................................ 707/3
(58) Field of Classification Search .................. 707/3
See application file for complete search history.

(56) References Cited

U.S. PATENT DOCUMENTS 5,993,001 A * 11/1999 Bursell et al. .............. 351/212

6,503,085 B1 * 1/2003 Elkind ........................ 434/236

\* cited by examiner

*Primary Examiner*—Chong H Kim
(74) *Attorney, Agent, or Firm*—Peter F. Corless; Steven M. Jensen; Edwards Angell Palmer & Dodge LLP

(57) ABSTRACT

A stereographic network monitoring system is provided to display a stereographic representation of an abnormal unit in a controlled device monitored via a network, wherein the stereographic representation shows the abnormal unit and its relative position, so that a supervisor can be clearly informed the relative position of the component inside the controlled device and promptly take appropriate measures to remedy. This system includes a monitoring server, a database, at least a controlled device, a network unit and a display unit. The monitoring server is connected to the database and controlled device via the network unit. When the controlled device sends an abnormal message to the monitoring server, it can retrieve the device stereogram and basic data of the unit components of the controlled device for display in the displaying unit.

6 Claims, 4 Drawing Sheets

STEREOGRAPHIC NETWORK MONITORING SYSTEM AND METHOD THEREOF

FIELD OF THE PRESENT INVENTION

The present invention relates to a network monitoring technique, and more particularly, to a method and system of remotely monitoring operational status of a controlled device.

BACKGROUND OF THE PRESENT INVENTION

Due to the prosperous development of network technology, data can be transmitted all over the world through network. Work that requires 24-hour monitoring by man can now be monitored through connections of information unit so that any internal and external status of the monitored work can be read and promptly controlled. Current network monitoring mechanism connects the monitoring side and the monitored side via a network connection, thus a program installed inside the monitored side can be updated remotely from the monitoring side. The monitored side transmits operating status thereof to the monitoring side, in order for the monitoring side to control the operating status of the monitored side at anytime. For instance, if there is a breakdown at the monitored side, a text message informing the breakdown will be sent to a supervisor at the monitoring side for analyzing the feasibility of fixing the breakdown online. An experienced supervisor is capable of taking appropriate measures based on the text message. Conversely, an inexperienced supervisor may midjudge or misunderstand the meaning of the text message and take the wrong measures to fix the problem, which may lead to a greater damage to the information facility at the monitored side.

SUMMARY OF THE PRESENT INVENTION

In light of the shortcomings of the conventional technique mentioned above, a primary objective of the present invention is to provide a stereographic network monitoring system and a method thereof such that when a component inside a controlled device breaks down, the structure of the entire controlled device consisting of the breakdown component is displayed stereographically, so that the relative position of the breakdown component can be shown clearly. This avoids damages resulted from wrong measures taken by an inexperienced personal who misjudges or misunderstands the meaning of the text warning message.

In accordance with the above objectives, the present invention proposes a stereographic network monitoring system, comprising a network unit (i.e. Internet or intranet) for data transmission, at least one controlled computer, a monitoring server, a database, and a display unit.

The at least one controlled computer detect the operating status of components in various computer units (e.g. CPU, hard disk, memory, fan, display card, motherboard, monitor, etc) of the controlled computer and send out a signal through the network unit when breakdowns occur.

The monitoring server updates the program installed in the controlled computer program via the network unit and receives the signals sent by the controlled computer to inform supervisor about the operating status at the monitored side.

The database stores stereogram representation of the controlled computer and basic information of any internal and external units of the controlled computers, and the database can be provided in the host computer and connected with the monitoring server through the network unit or in the monitoring server itself or the controlled computer.

When a component malfunctions, the monitoring server receives a signal indicating the breakdown from the controlled computer, and then the monitoring server extracts a stereogram and basic information corresponding to the notified breakdown component of the controlled computer from the database.

The present invention proposes a stereographic network monitoring method for the above stereographic network monitoring system, the method comprises: (1) setting up the network unit constructed by the Internet or intranet and connecting the monitoring server and the at least one controlled computer to the network unit; (2) detecting whether the operational status of the components of the controlled device is normal; if normal, proceeding to step (3) transmitting the operational status of the components of the controlled device to a display unit for displaying and then returning to step (2); if not normal, proceeding to step (4); (4) having the monitoring server retrieve basic data of any specific one of the components and stereogram of the controlled device stored in a database connected to the monitoring server, wherein the any specific one of the components of the controlled device is one detected to be not normal; and (5) transmitting the basic data of the any specific one of the components and stereogram of the controlled device to the display unit for display. In summary, the present invention may use a drawing tool such as FLASH to draw the stereogram of the controlled computers, and stores these stereogram and basic data into the database. The computer regularly detects the operating status of the components. When a breakdown is detected, a breakdown message can be transmitted through the network unit to the monitoring server, and the monitoring server will automatically extract the stereogram of the controlled computer and basic data corresponding to the breakdown component from the database upon receiving the breakdown message from a detecting unit for detecting the operational status of the controlled computer. Then, the basic data of the component and stereogram of the controlled computer will be displayed in the display unit, hence, the supervisor is clearly informed of the position of the breakdown component, so that the problem caused by the inexperienced supervisor who may misunderstand the text message previously mentioned, can be effectively avoided.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENT

The present invention is described in the following with specific embodiments, so that one skilled in the pertinent art can easily understand other advantages and effects of the present invention from the disclosure of the present invention. The present invention may also be implemented and applied according to other embodiments, and the details may be modified based on different views and applications without departing from the spirit of the present invention.

The following example further describes the viewpoints of the present invention in detail. However, it is to be understood that the scope of the present invention is not limited in any way by the detailed description.

Figure 1:
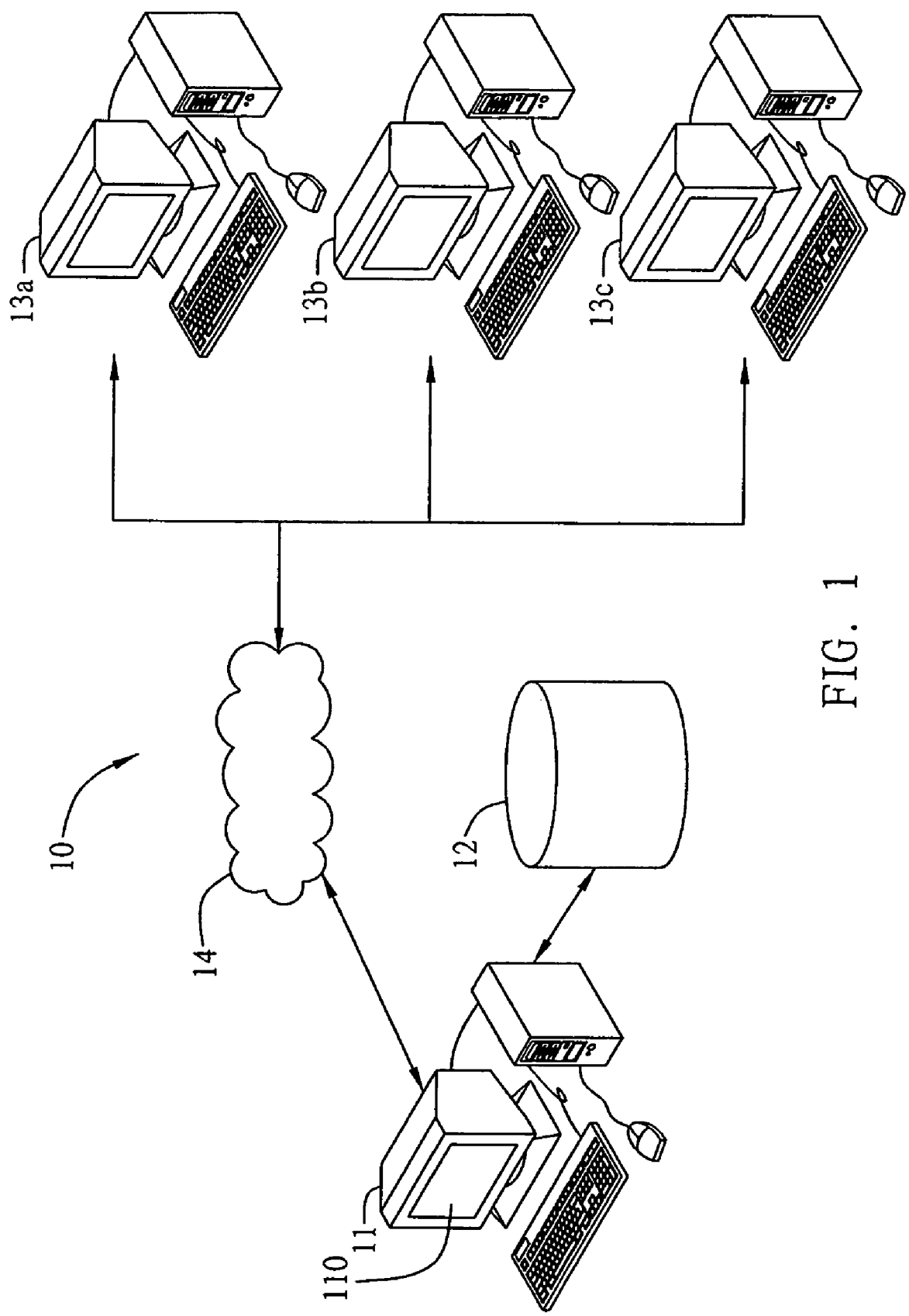
FIG. 1 is a schematic block diagram showing a basic structure of a first embodiment of a stereographic network monitoring system of the present invention.

FIG. 1 illustrates a structural diagram of a first embodiment of the stereographic network monitoring system of the present invention. As shown in FIG. 1, a stereographic network monitoring system 10 of the present invention includes: a monitoring server 11, a database 12, controlled computers 13a, 13b and 13c (which are to be collectively called controlled computers hereinafter, and controlled computer 13a is used as an example), and a network unit 14. Managing software is installed in the monitoring server 11 for updating program contents of the controlled computers, and a display unit 110 (e.g. a LCD monitor) is provided in the monitoring server 11. The database 12 can be installed in the host computer (not shown) and connected to the monitoring server 11 through the network unit 14, or in the monitoring server 11 itself. The database 12 stores stereogram of units of the controlled computers and basic data of the components of the controlled computers that constitute the units. The units of the controlled computer can be for example a CPU, a hard disk, a memory, a fan, a display card, a motherboard, a monitor, etc. The basic data includes, for example, component code numbers, component names, component descriptions, breakdown message, breakdown message code numbers, etc. Detecting software or a detector (not shown) is installed in the controlled computer 13a for detecting the operating status of components. It should be noted that the detecting software or the detector can also be installed in the monitoring server 11 or, independently from the controlled computer 13a and the monitoring server 11, depending on the requirement in practice. In addition, the network unit 14 can be an intranet or Internet. During the network monitoring process, the detecting software or the detector of the controlled computer 13a regularly detects the operating status of the components every period of time (e.g. every ten minutes), and when a breakdown in one of the components is detected, a breakdown message can be transmitted to the monitoring server 11 via the network unit 14. Based on this breakdown message, the monitoring server 11 automatically retrieves stereogram and basic data from the database 12 corresponding to the breakdown component identified by the breakdown message. The extracted stereogram and basic data will be displayed through the display unit 110, so that the stereogram of the controlled computer and the basic data of the component of the controlled device can be promptly and clearly viewed by the supervisor to take appropriate measures.

Figure 2:
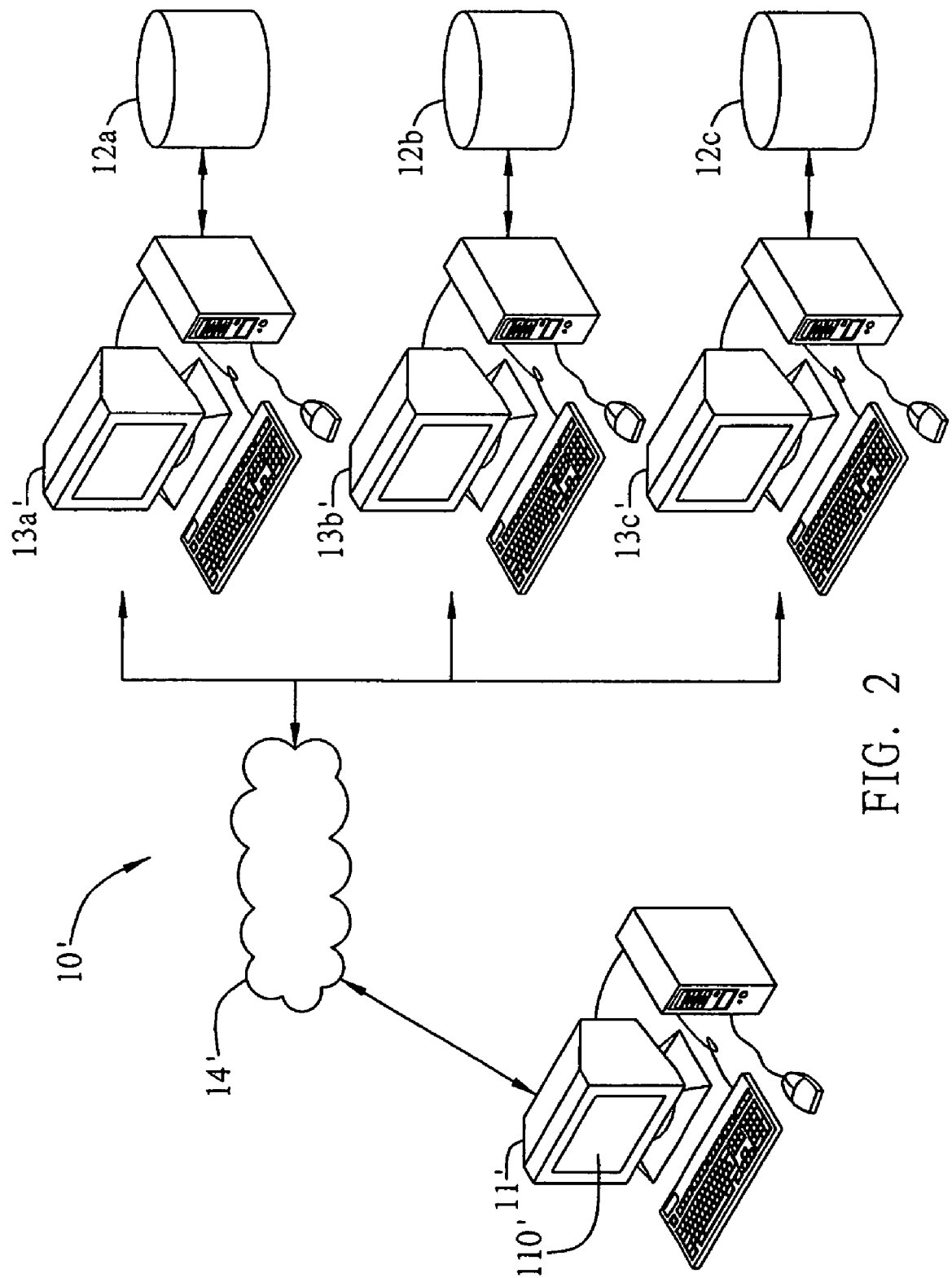
FIG. 2 is a schematic block diagram showing a basic structure of a second embodiment of the stereographic network monitoring system of the present invention.

FIG. 2 illustrates a structural diagram of a second embodiment of the stereographic network monitoring system 10' of the present invention. Certain parts of the system 10' in this example have similar operational relations and structural connections with the previously mentioned example, thus only the difference will be further described. In this example, databases 12a, 12b, and 12c are provided inside the controlled computers 13a', 13b', and 13c', respectively. The basic data of the component and the stereogram of the controlled computers 13a', 13b', and 13c' are stored in the database 12a', 12b', and 12c', respectively. During the network monitoring process, the operating status of the components is detected every period of time (e.g. every ten minutes) by the detecting software or the detector of each unit of the controlled computers. When a component breakdown inside the controlled computer 13a' is detected, the stereogram of the unit that has the breakdown component and the basic data of the breakdown component will be extracted automatically from the corresponding built-in database 12a, and the extracted stereogram and basic data will be transmitted to a monitoring server 11' through the network unit 14 to be displayed by a display unit 110'. Thus, the relative position and basic data of the breakdown component can be clearly viewed by supervisors, thus allowing accurate measure to be taken promptly.

Figure 3:
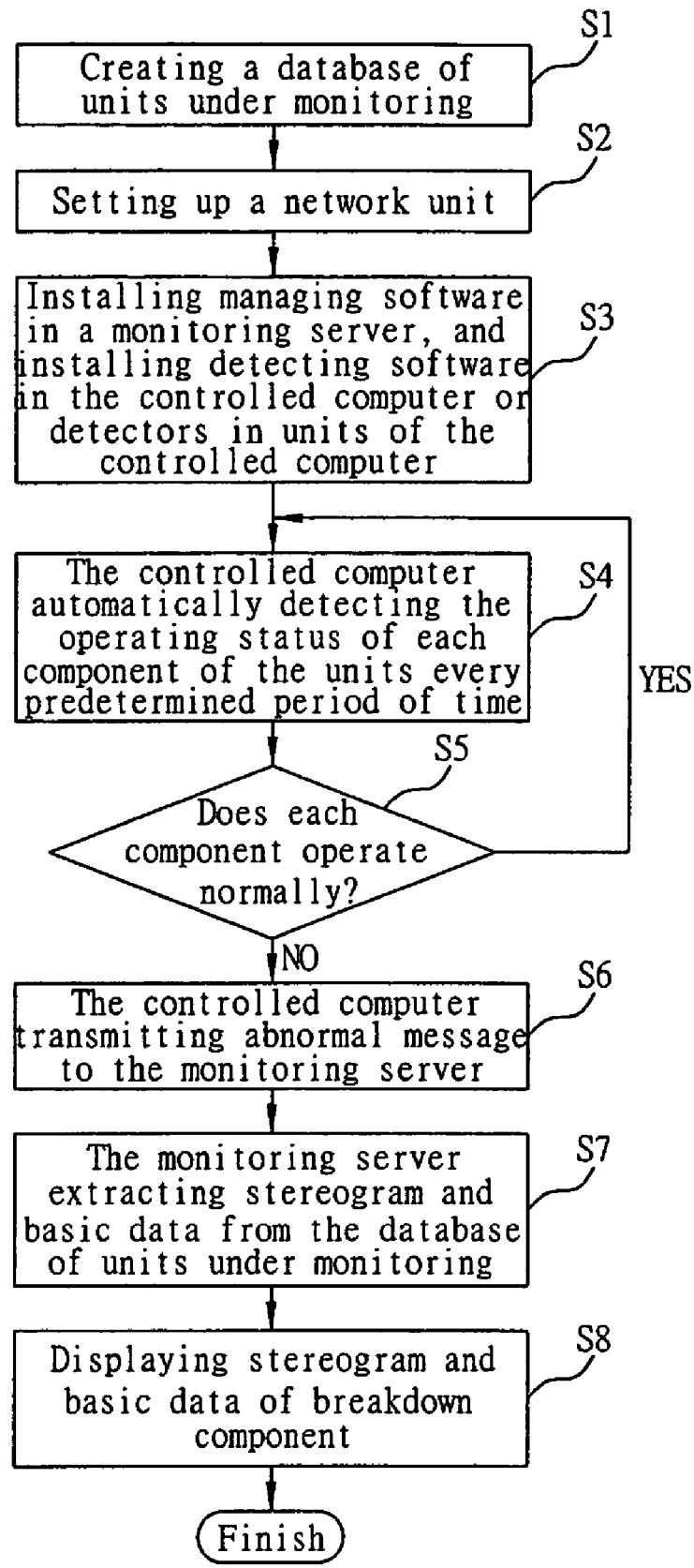
FIG. 3 is a flow chart showing required procedures of a stereographic network monitoring method of the present invention.

FIG. 3 illustrates a flow chart of the stereographic network monitoring method of the present invention. As shown in FIG. 3, firstly step S1 is executed by creating a database 12. Detailed procedures of creating the database are disclosed in FIG. 4, then, move to step S2. In step S2, the network unit 14 is set up for data transmission, the network unit 14 can be an Internet or intranet, so that the monitoring server can be connected to the controlled computer(s) by the network unit 14, then, move to step 3.

In step S3, managing software is installed in the monitoring server 11 connected at the front-end of the network unit 14, so that the program contents of the controlled computer can be updated by the monitoring server 11 via the network unit 14. It allows that messages sent by the controlled computer 13a can be received by the monitoring server 11. In addition, a detecting software or a detector is installed in the controlled computer 13a, which can regularly detect the operating status of the components of the controlled computer 13a therein, then, move to step 4.

In step S4, the operating status of each of the components in each unit will be automatically detected every predetermined period of time, then move to step 5.

In step S5, the detecting software or the detector of the controlled computer detects whether the operating status of the components is normal or not. Iif the status is normal, then go back to step S4 to continually detect the operating status of each component; else, move to step S6 when breakdown is detected.

In step S6, the controlled computer 13a transmits the breakdown or abnormal message to the monitoring server 11, then move to step S7.

In step S7, when the monitoring server 11 receives the breakdown message, the stereogram of the corresponding controlled computer 13a and the basic data of the breakdown component are automatically retrieved from the database 12 based on this breakdown message, and then move to step S8.

In step S8, the monitoring server 11 automatically displays stereogram of the controlled computer 13a and basic data of the breakdown component, so that the supervisor can be clearly informed the relative position and basic information of the breakdown component in order to promptly and accurately taking appropriate measures.

Figure 4:
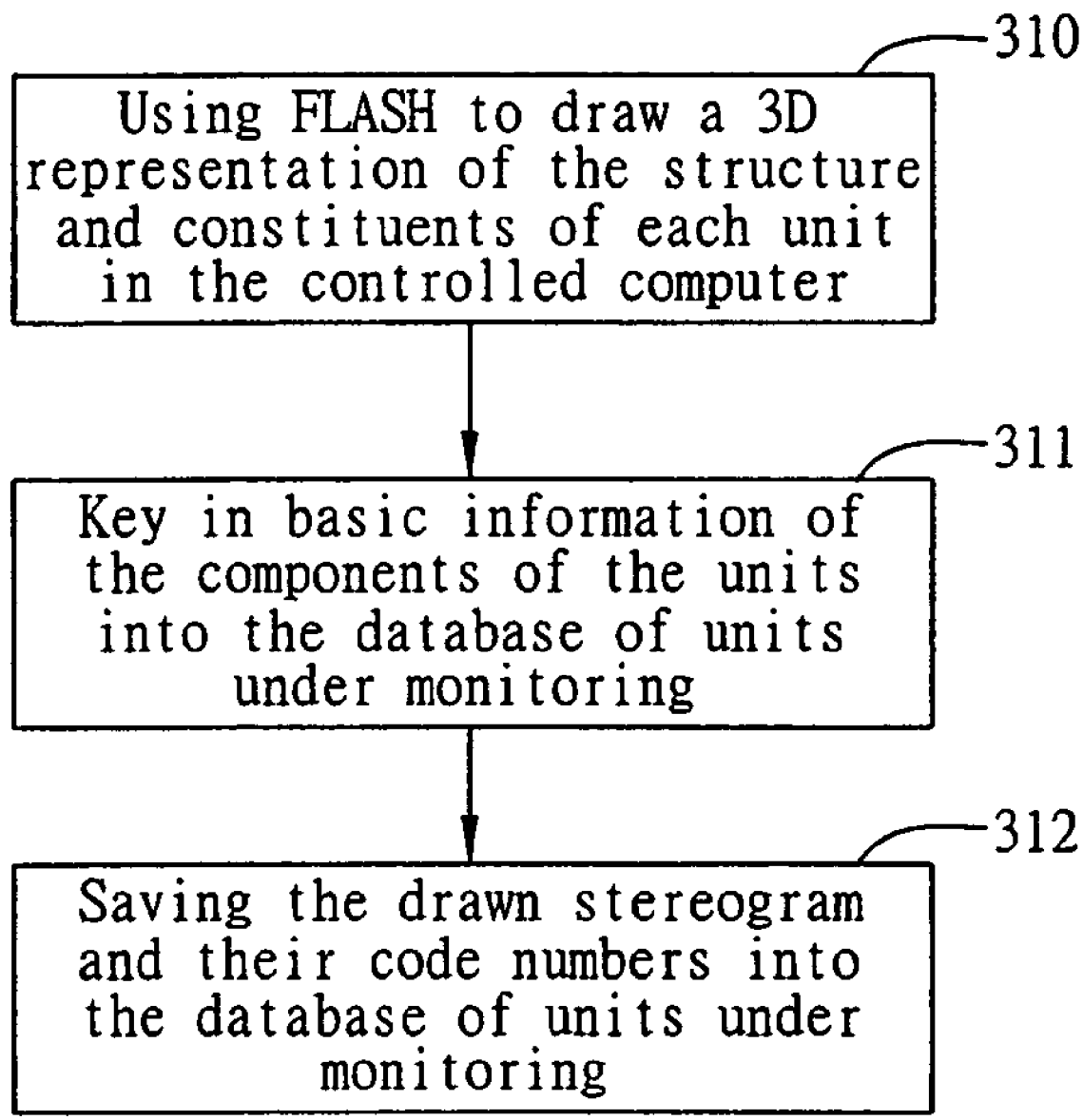
FIG. 4 is a flow chart showing required procedures for creating a database for units under monitoring in the stereographic network monitoring system of the present invention.

FIG. 4 illustrates a flow chart of creating a database of the stereographic network monitoring system of the present invention. First of all, as shown in step S10, drawing personnel uses FLASH to draw 3D representation of the units of the controlled computer, then, move to step S11.

In step S11, a supervisor keys in the basic data of the external and internal component of the units in the controlled computer into the database 12.

In step S12, the supervisor stores the stereogram drawn in step S10 and their code numbers into the database 12.

In addition, there are three ways of installing the database 12. First, as described in the first embodiment of the stereographic network monitoring system of the present invention, the database 12 is installed in the host computer and connected to the monitoring server 11 via the network unit 14. Second, the database 12 is installed in the monitoring server 11. The third method is to install the database 12 in the controlled computers 13a, 13b, and 13c, as already described in the second embodiment of the stereographic network monitoring system of the present invention.

Hence, through the system and the method of stereographic network monitoring of the present invention, the stereographic structure of the breakdown unit and the basic data of a breakdown component inside the unit will be presented, so that the supervisor can be clearly informed of relative position of the breakdown component in the unit and its basic data. Thus, the problem occurred in the prior technique due to inexperienced supervisors, who may misunderstand the meaning conveyed in the text message and select wrong measures that may lead to a larger damage to the controlled computer, can be avoided.

It should be apparent to those skilled in the art that the above description is only illustrative of specific embodiments and examples of the present invention. For instance, the controlled computer described is not limited only to computer products; it could be other controlled device such as a cell phone, a digital camera or a digital personal assistance. The present invention should therefore cover various modifications and variations made to the herein-described structure and operations of the present invention, provided they fall within the scope of the present invention as defined in the following appended claims.

What is claimed is:

1. A network monitoring method for monitoring whether a controlled device is operating abnormally, the controlled device being connected via a network unit to a monitoring server and having a plurality of components, the monitoring server having a database stored with stereogram and basic data corresponding to the components of the controlled device, the method comprising the steps of:

receiving a component abnormal message transmitted from the controlled device with the monitoring server;

extracting a corresponding stereogram, which corresponds to an abnormally operating component recorded in the component abnormal message;

extracting from the database corresponding basic data, which correspond to the abnormally operating component recorded in the component abnormal message; and displaying the corresponding stereogram and the corresponding basic data.

2. The method of claim 1, wherein the network unit is an Internet.

3. The method of claim 1, wherein the network unit is an intranet.

4. The method of claim 1, wherein the coffesponding stereogram comprises a 3-D representation of units of the corresponding component of the controlled device.

5. The method of claim 1, wherein the coffesponding stereogram displays a corresponding position of the component in the controlled device.

6. The method of claim 1, wherein the coffesponding stereogram is a FLASH file.

* * * * *